United States Patent [19]

Rich

[11] Patent Number: 5,546,545
[45] Date of Patent: Aug. 13, 1996

[54] ROTATING PRIORITY SELECTION LOGIC CIRCUIT

[75] Inventor: Stephen E. Rich, Chittenden County, Vt.

[73] Assignee: International Business Machines Corporation, Armonk, N.Y.

[21] Appl. No.: 352,642

[22] Filed: Dec. 9, 1994

[51] Int. Cl.[6] .................................................. G06F 13/14
[52] U.S. Cl. ........................ 395/291; 395/281; 395/296; 395/302; 395/375
[58] Field of Search ................... 395/281, 291, 395/375, 860, 864, 296, 303

[56] References Cited

U.S. PATENT DOCUMENTS

| | | | |
|---|---|---|---|
| 4,887,084 | 12/1989 | Yamaguchi | 395/281 |
| 4,914,574 | 4/1990 | Terada et al. | 395/375 |
| 5,095,460 | 3/1992 | Rodeheffer | 395/650 |
| 5,222,218 | 6/1993 | Smith | 395/325 |
| 5,274,785 | 12/1993 | Kuddes et al. | 395/325 |
| 5,321,640 | 6/1994 | Anderson et al. | 395/291 |
| 5,388,249 | 2/1995 | Hotta et al. | 395/550 |

Primary Examiner—Jack B. Harvey
Assistant Examiner—Raymond N. Phan
Attorney, Agent, or Firm—Whitham, Curtis, Whitham & McGinn; Charles W. Peterson, Jr.

[57] ABSTRACT

A rotating priority selection circuit executes a priority scheme for the purpose of selecting which of several possible instructions that should be executed next in a microprocessor design that allows for the execution of out of sequence instructions. The priority logic circuit selects instructions for execution based executing the oldest, by age, pending instruction if it is ready (i.e., operands available), but if the oldest instruction is not ready, then executing the next to oldest if it is ready and so on. The topology used borrows from a concept used for fast parallel adders. Logic at each node in the circuit produces the equivalent of a carry generate and a carry propagate. "Carries" are routed around the loop to cause input responses which are lower in priority to be suppressed. This loop is broken, so as not to feed back on itself, at the node which is pointed to by the pointer bus. The number of gate delays in this network is half that of prior schemes.

6 Claims, 7 Drawing Sheets

TWO BIT FUNCTION S2-1
ASSUME CARRY = 1
2 BIT PRIORITY FUNCTION

ROTATING PRIORITY SELECTION LOGIC CIRCUIT

BACKGROUND OF THE INVENTION

1. Field of the Invention

The present invention generally relates to the control of instructions to a pipelined processor of a stored program data processing machine and, more particularly, to a priority selection logic circuit to select the next instruction to be executed in a microprocessor having an architecture where instructions are executed out of sequence to achieve higher performance.

2. Description of the Prior Art

A microprocessor that is capable of issuing and executing machine instructions out of sequence can theoretically achieve a performance improvement of as high as 50%. However, the potential performance gain can be severely limited in actual practice due to the design of the instruction selection logic. Priority selectors are known which use either a tree or a chain structure. A tree structure with twelve inputs needs four levels ($\log_2 12$). In order to resolve, a signal needs to propagate from the lowest level of the tree to the top and back again to the bottom. The signal thus needs to traverse seven nodes to get to the output. In a fixed order priority selector, the logic at each node has to be at least one level deep. In a rotating priority selector, the logic at each node is considerably more complex and needs to be at least two or more levels deep. An optimum design in a twelve bit rotating priority selector in a tree structure would result in a fourteen stage delay path. The logic depth for a chain structure scales linearly by the number of inputs to be resolved. For a fixed priority selector, this would result in a twelve stage delay path. A twelve bit rotating priority selector would add at least one stage to the overall delay path yielding a critical path of thirteen gate delays.

SUMMARY OF THE INVENTION

It is therefore an object of the present invention to provide a circuit that executes a priority scheme for the purpose of selecting which of several possible instructions that should be executed next in a microprocessor design that allows for the execution of out of sequence instructions but which minimizes the gate delay in the critical path.

According to the invention, there is provided a priority logic circuit which selects instructions for execution based executing the oldest, by age, pending instruction if it is ready (i.e., operands available), but if the oldest instruction is not ready, then executing the next to oldest if it is ready and so on. The topology used borrows from a concept used for fast parallel adders. Logic at each node in the circuit produces the equivalent of a carry generate and a carry propagate. "Carries" are routed around the loop to cause input responses which are lower in priority to be suppressed. This loop is broken, so as not to feed back on itself, at the node which is pointed to by the pointer bus. The number of gate delays in this network can be as low as six for a twelve bit rotating priority selector. In a specific implementation, there are actually seven stages, with one extra inversion at the start used to generate true and complement for the input response and pointer bus.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
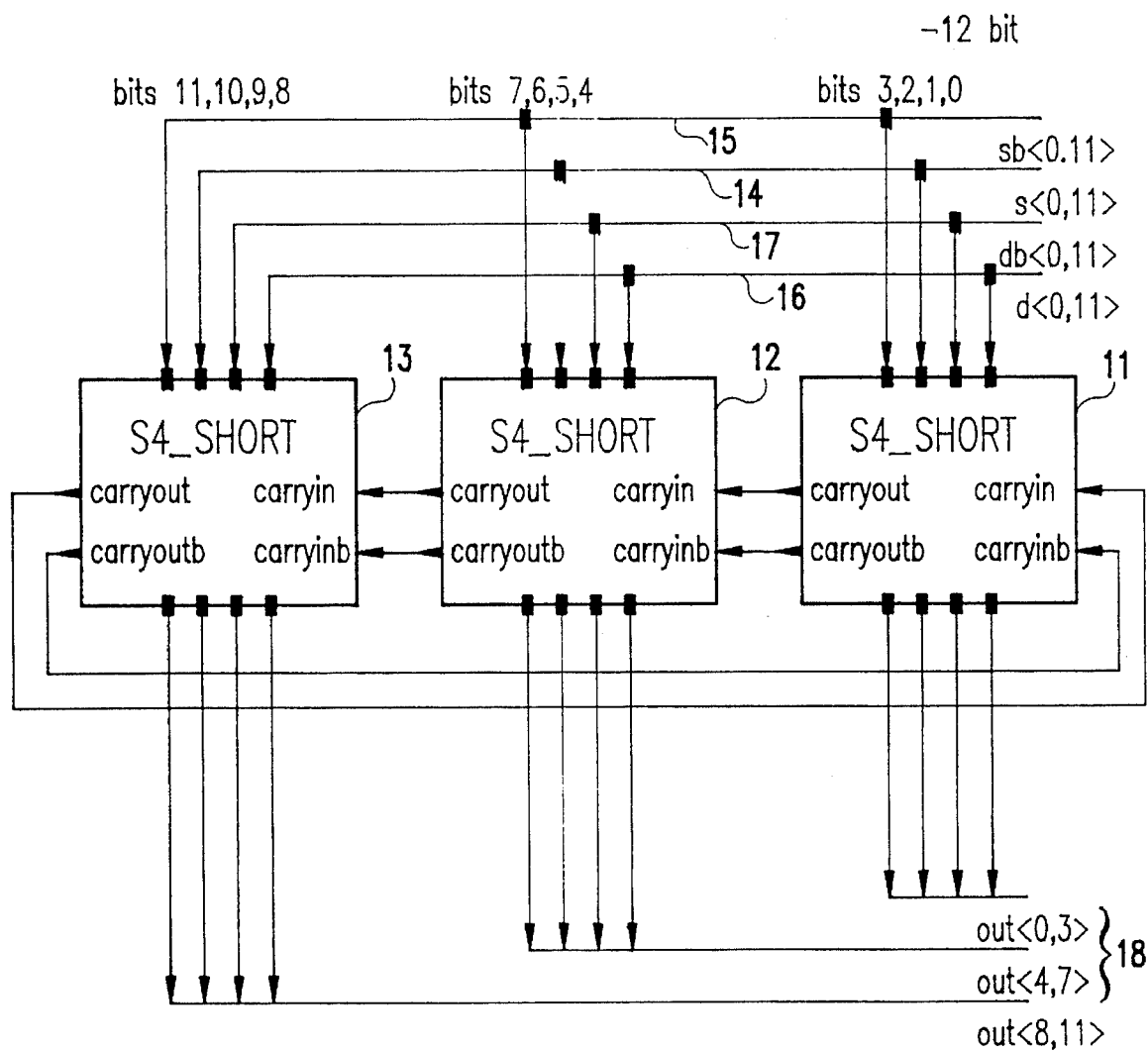
FIG. 1 is a block diagram showing a full 12-bit rotating priority circuit according to a preferred embodiment of the invention.

Referring now to the drawings, and more particularly to FIG. 1, there is shown the modular design of the high performance rotating priority circuit according to a preferred embodiment of the invention. This circuit is composed of three 4-bit priority modules 11, 12 and 13, here designated as "S4_SHORT". The example shown is for twelve bits, organized in 4-bit multiples, but the modular design allows for other bus and data sizes in multiples of four. These priority modules are connected to selected bit lines of each of four 12-bit buses; a priority bus 14 and its complement bus 15, and a data bus 16 and its complement bus 17. The conventions adopted here are that the complement signal or bus is designated by the suffix "b" and the line bus line or lines are denoted within the symbols < and >. Thus, for example, the complement of the twelve bits of the priority bus 14, represented as s<0,11>, is represented as sb<0,11>. The priority bus 14, s<0,11>, has its first four or least significant bits (LSBs), s<0,3>, connected to module 11, it next four bits, s<4,7>, connected to module 12, and its last four or most significant bits (MSBs), s<8,11>, connected to module 13. Similar connections are made for each of the other three buses. The four bit output, out<0,3>, of module 11 is combined with the four bits outputs, out<4,7> and out<8,11>, of modules 12 and 13, respectively, to form the output bus 18 of the priority selector. Each of the modules 11, 12 and 13 have carry in and carry out connections to form a feedback loop 19. The carry in and carry out connections are supplied as both true and complement signals; i.e., carryin, carrinb, carryout, and carryoutb.

The incoming bits on the priority bus 11 have one and only one bit high (active), and this represents the highest priority instruction using the criteria of age. The twelve bits represent twelve instructions waiting to be executed. Not all instructions are valid or ready to be executed at any point in time. The data bus 16, d<0,11>, and its complement bus 17, db<0,11>, also contain twelve bits. An active d-bit indicates that the corresponding instruction has a valid operand and is ready to be executed. The highest priority instruction pointed to by the priority bus 14 may or may not represent a valid or ready instruction.

The functional task of the rotating priority circuit shown in FIG. 1 is to examine both the priority and the data buses 14 and 16 (and their complement buses 15 and 17) and select the instruction according to the following criteria:

1. select the instruction pointed to by the priority bus 14 if valid;

2. if (1) is not satisfied, look at the next instruction in a rotation fashion, i.e., if s<6> is active and d<6> is not active, look at d<5>, then d<4> and so on until an active d<n> is found; and 3. provide a 12-bit output bus according to the above. Note that only one bit will be active in the output bus 18 and it will correspond to the instruction to be executed.

The criteria are satisfied in the minimum amount of time as determined by the number of logical decisions that must be made from input to output.

Figure 2:
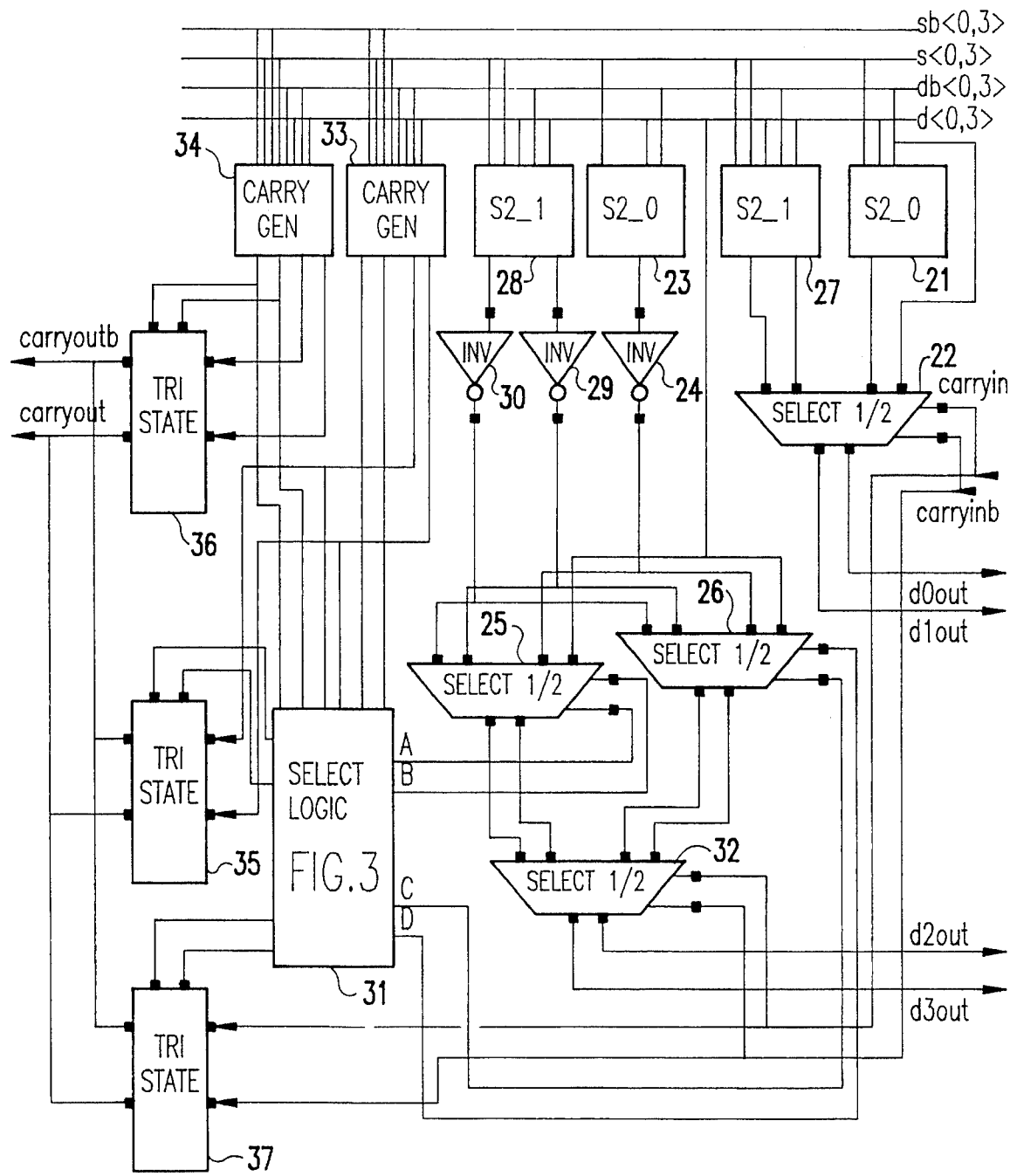
FIG. 2 is a block and logic diagram showing in more detail one of the 4-bit rotating priority circuits used in the FIG. 1.

The S4_SHORT module used for the modules 11, 12 and 13 is shown in more detail in FIG. 2, to which reference is now made. The example illustrated is for module 11 which receives the four LSBs of each of the buses 14 to 17 and produces the four LSBs of the output bus 18, but otherwise the modules are identical. This module is itself composed of several standard modules and furthermore is divided functionally as a data circuit and a carry circuit. In the data circuit, the first of the standard modules are a first 2-bit priority selection circuit, S2_0, which assumes that the carry in signal is zero and another 2-bit priority selection circuit, S2_1, which assumes that the carry in signal is active (high). Each of these modules is used twice. The first S2_0 module 21 is connected to lines s<1>, d<1>, and db<0> and provides a single output, corresponding to outb<1>, to a first of four selectors 22. The first S2_1 module 27 is connected to lines s<0>, s<1>, d<0>, db<0>, and d<1>, and provides two outputs, corresponding to outb<0> and outb<1>, to selector 22. The fourth input of selector 22, corresponding to outb<0>, is connected directly to the db<0> line. The carryin and carrinb signals are used by selector 22 to output the out<0> and out<1> signals in the output bus 18.

The second S2_0 module 23 is connected to lines s<3>, d<3> and db<2>, but its output, corresponding to outb<3>, is first inverted by invertor 24 before being supplied to second and third selectors 25 and 26. Line d<2> is directly connected to selectors 25 and 26 corresponding to out<2>. The second S2_1 module 28 is connected to lines s<2>, s<3>, d<2>, db<2>, and d<3>, but its outputs, corresponding to outb<2> and outb<3>, are first inverted by invertors 29 and 30 before being supplied to selectors 25 and 26. The selectors 25 and 26 respond to selection signals generated by selection logic 31 to generate two output signals. The two output signals of selectors 25 and 26 are supplied to a fourth selector 32, which again responds to the carryin and carryinb signals to provide two outputs, these corresponding to out<2> and out<3> of the output bus 18.

The carry circuit uses two other modules which are connected to the priority and data buses (and their complements), and these are the carry generators 33 and 34. Carry generator 33 is connected to lines s<0>, sb<0>, s<1>, sb<1>, d<0>, db<0>, d<1>, and db<1>. The carry generator 33 provides four outputs, a local carry signal and its complement, a select local signal and a select global signal. Each of these are input to the selection logic 31. In addition, the select local and select global signals are input to tri-state circuit 35, the control of which is provided by the selection logic 31. The carry generator 34 is connected to lines s<2>, sb<2>, s<3>, sb<3>, d<2>, db<2>, d<3>, and db<3>. The carry generator 34 provides four outputs, a local carry signal and its complement, a select local signal and a select global signal, but only the select local and select global signals are input to the selection logic 31. The local carry signal and its complement from the carry generator 34 are input to a second tri-state circuit 36, and the select local and select global signals from carry generator 34 are also used to control the tri-state circuit 36. There is a fourth tri-state circuit 37 which receives as its inputs the carryin and carryinb signals and is controlled by outputs from the selection logic 31. The outputs of the three tri-state circuits are connected to form the carryout and carryoutb outputs of the module.

Figure 3:
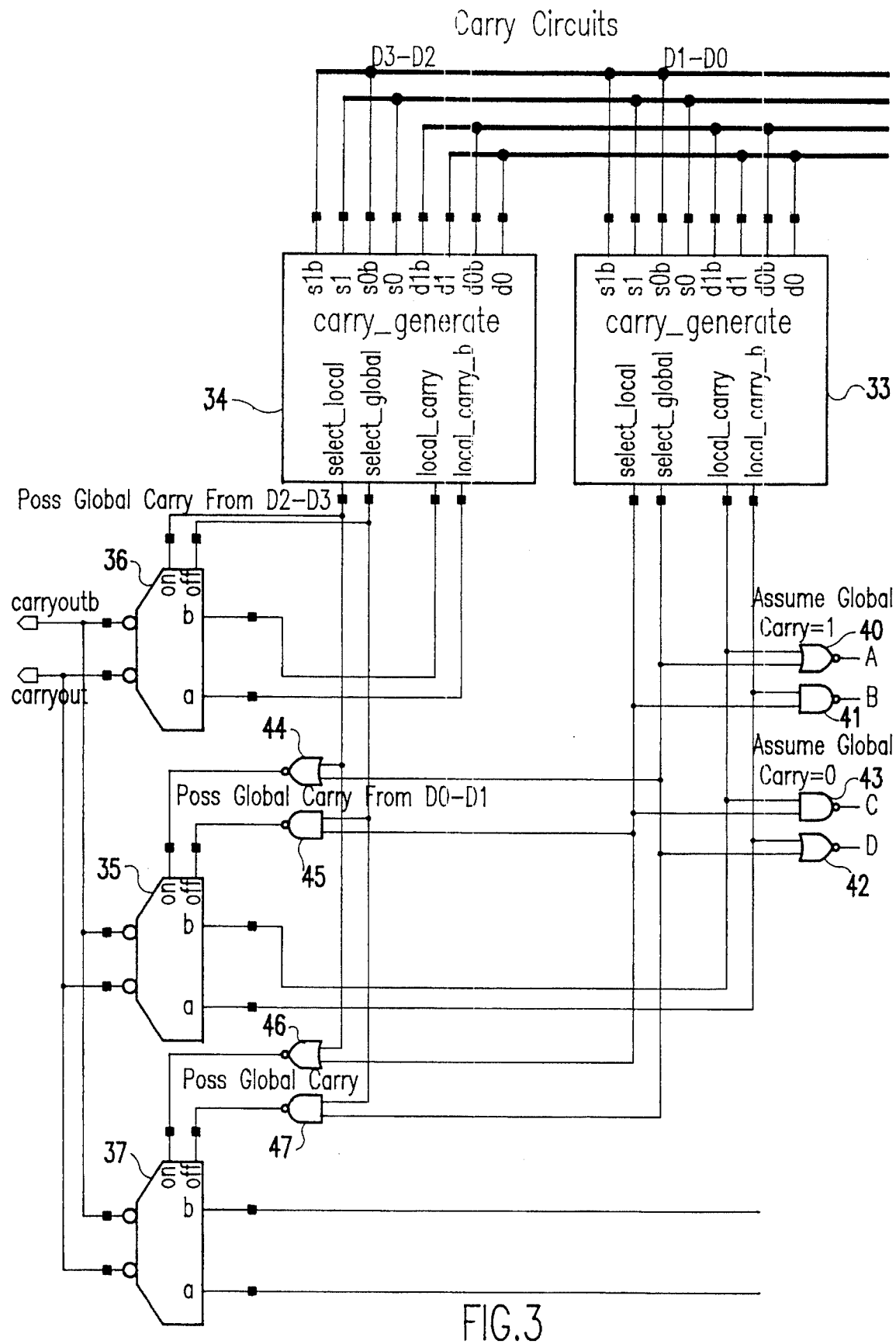
FIG. 3 is a block and logic diagram showing the details of the selection logic of FIG. 2.

The selection logic 31 is shown in more detail in FIG. 3 and comprises a plurality of NOR and NAND gates. A first NOR and NAND gate combination 40 and 41, respectively, assumes the global carry to be active (high). The NOR gate 40 receives as its inputs the local carry signal and the select global signal from carry generator 33 and generates the selection signal A to selector 25 (FIG. 2). The NAND gate 41 receives the complement of the local carry signal and the select local signal from the carry generator 33 and generates the selection signal B to selector 25. A second NOR and NAND gate combination 42 and 43, respectively, assumes the global carry to be zero. The NOR gate 42 receives the complement of the local carry signal and the select global signal from carry generator 33 and generates the selection signal D to selector 26 (FIG. 2). The NAND gate 43 receives the local carry signal and the select local signal from the carry generator 33 and generates the selection signal C to the selector 26.

A third NOR and NAND gate combination 44 and 45, respectively, generates the control signals for the tri-state circuit 35. The NOR gate 44 receives the select global signal from carry generator 33 and the select local signal from the carry generator 34 and generates an "on" signal for the tri-state circuit 35. The NAND gate 45 receives the select global signal from carry generator 33 and the select global signal from carry generator 34 and generates the "off" signal for the tri-state circuit 35. A fourth NOR and NAND gate combination 46 and 47, respectively, are connected to control the third tri-state circuit 37. The NOR gate 46 receives the select local signal from carry generator 33 and the select local signal from carry generator 34 and generates the "on" signal for the tri-state circuit 37. The NAND gate 47 receives the select global signal from carry generator 33 and the select global signal from the carry generator 34 and generates the "off" signal for the tri-state circuit 37.

Figure 4:
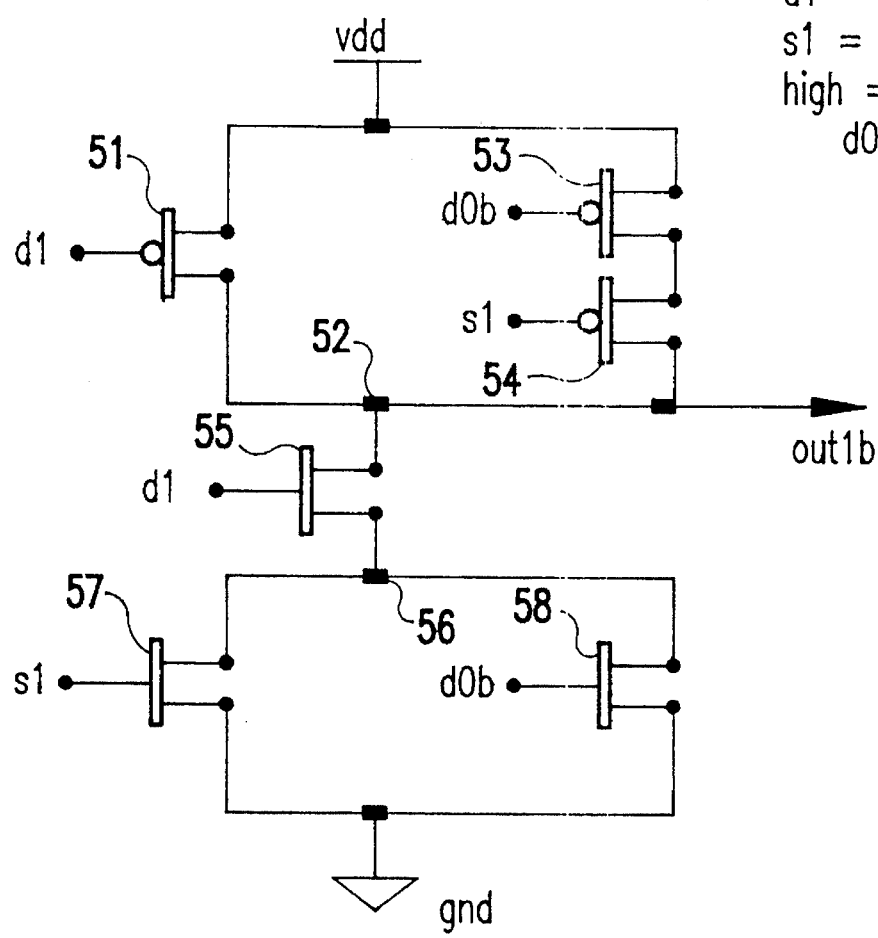
FIG. 4 is a circuit diagram of a 2-bit priority function assuming that the carry in is zero.

The S2_0 2-bit select circuit shown in FIG. 4. This circuit, used for modules 21 and 23 in FIG. 2, assumes that the carry in signal is zero. The connections shown in FIG. 4 are for the module 21, but it will be understood that the connections, though similar, are as defined above. Thus, in place of line s<1> in module 21, read line s<3> in module 23. A first p-channel field effect transistor (FET) 51 has its source connected to a voltage source $V_{DD}$ and its drain to node 52. Node 52 supplies the output signal outb<1>. The gate of FET 51 is connected to line d<1>. Two other p-channel FETs 53 and 54 are connected in series between voltage source $V_{DD}$ and node 52. The gate of FET 53 is connected to line db<0>, and the gate of FET 54 is connected to line s<1>. A first n-channel FET 55 has its source connected to circuit ground and its drain to node 56. The gate of FET 55 is connected to line s<1>. A second n-type FET 57 is connected in parallel with FET 55 between circuit ground and node 56. The gate of FET 57 is connected to line db<0>. A third n-type FET 58 is connected between nodes 52 and 56 and has its gate connected to line d<1>. As is conventional in complementary metal oxide semiconductor (CMOS) logic circuits of the type shown in FIG. 4, a pair of FETs in parallel, such as FETs 55 and 57, perform an OR function, and a pair of FETs in series, such as FETs 53 and 54, perform an AND function.

Figure 5:
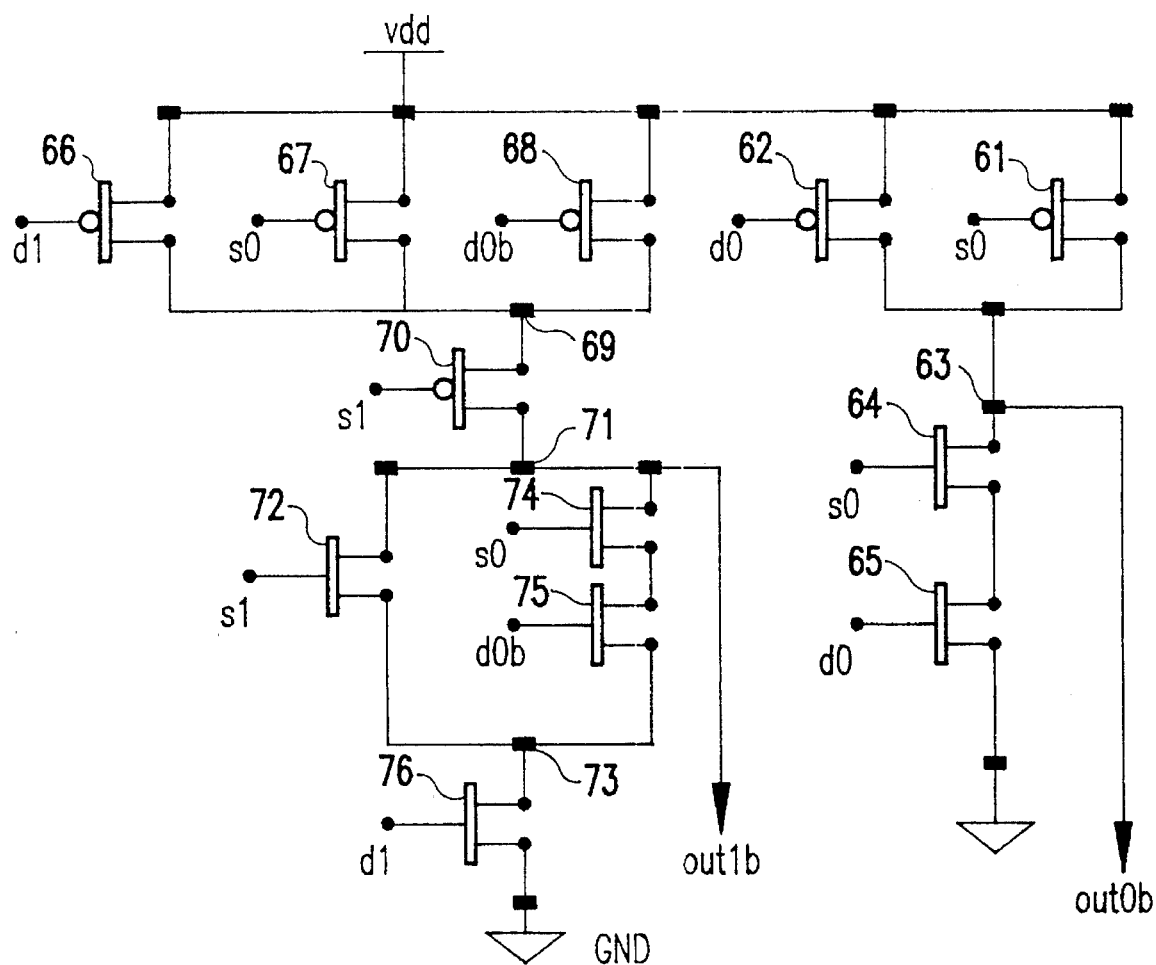
FIG. 5 is a circuit diagram of a 2-bit priority function assuming that the carry in is one (i.e., active high)

FIG. 5 shows the S2_1 module which comprises two parts, corresponding to the two outputs generated by this circuit. FIG. 5 shows the connections for module 27, and again it will be understood that while the connections for module 28 are similar, the connections are as defined above. The first part of the S2_1 module comprises a pair of p-channel FETs 61 and 62 connected in parallel between the voltage source $V_{DD}$ and node 63. The gate of FET 62 is connected to line d<0>, and the gate of FET 61 is connected to line s<0>. A pair of n-channel FETs 64 and 65 are connected in series between node 63 and circuit ground. The gate of FET 64 is connected to line s<0>, and the gate of FET 65 is connected to line d<0>. The node 63 is connected to outb<0>. The second part of the circuit comprises three p-channel FETs 66, 67 and 68 connected in parallel between voltage source $V_{DD}$ and node 69. The gate of FET 66 is connected to line d<1>. The gate of FET 67 is connected to line s<0>. The gate of FET 68 is connected to line db<0>. A fourth p-channel FET 70 connects node 69 to node 71. The gate of FET 70 is connected to line s<1>. A first n-channel FET 72 is connected between node 71 and node 73. The gate of FET 72 is connected to line s<1>. A pair of n-channel FETs 74 and 75 are connected in series between nodes 71 and 73. The gate of FET 74 is connected to line s<0>, and the gate of FET 75 is connected to line db<0>. Finally, a fourth n-channel FET 76 is connected between node 73 and circuit ground. The gate of FET 76 is connected to line d<0>.

Figure 6:
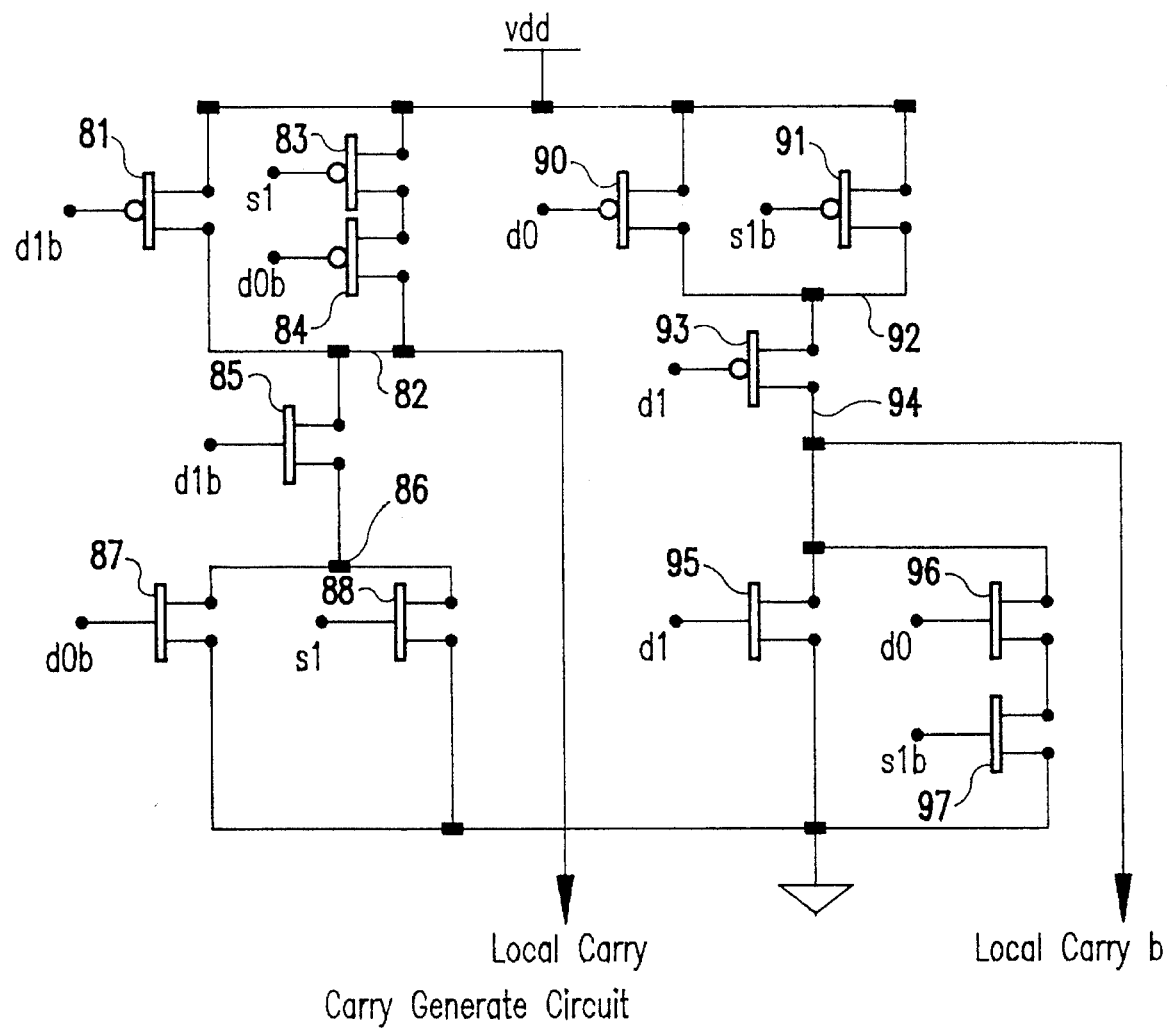
FIG. 6 is a circuit diagram of a portion of a carry generate circuit producing both a true local carry output and complement local carry output.

FIG. 6 shows the carry generation portion of the carry generator circuits 33 and 34. The connections shown are for carry generator circuit 33, the connections for carry generator circuit being defined above. This portion of the circuit is divided into two parts, corresponding to the two carry output signals. The first part comprises a first p-channel FET 81 connected between the voltage source $V_{DD}$ and node 82. The gate of FET 81 is connected to line db<1>. Two p-channel FETs 83 and 84 are connected in series between voltage source $V_{DD}$ and node 82. The gate of FET 83 is connected to line s<1>, and the gate of FET 84 is connected to line db<0>. A first n-channel FET 85 is connected between node 82 and node 86. The gate of FET 85 is connected to line db<1>. A pair of n-channel FETs 87 and 88 are connected in parallel between circuit ground and node 86. The gate of FET 87 is connected to line db<0>, and the gate of FET 88 is connected to line s<1>. The second part of the circuit comprises a pair of p-channel FETs 90 and 91 connected between the voltage source $V_{DD}$ and node 92. The gate of FET 90 is connected to line d<0>, and the gate of FET 91 is connected to line sb<1>. A third p-channel FET 93 is connected between node 92 and a node 94. The node 94 supplies the complement of the local carry output signal. A first n-channel FET 95 is connected between circuit ground and node 94. The gate of FET 95 is connected to line d<1>. A pair of n-channel FETs 96 and 97 are connected in series between circuit ground and node 94. The gate of FET 96 is connected to line sb<1>, and the gate of FET 97 is connected to line d<0>.

Figure 7:
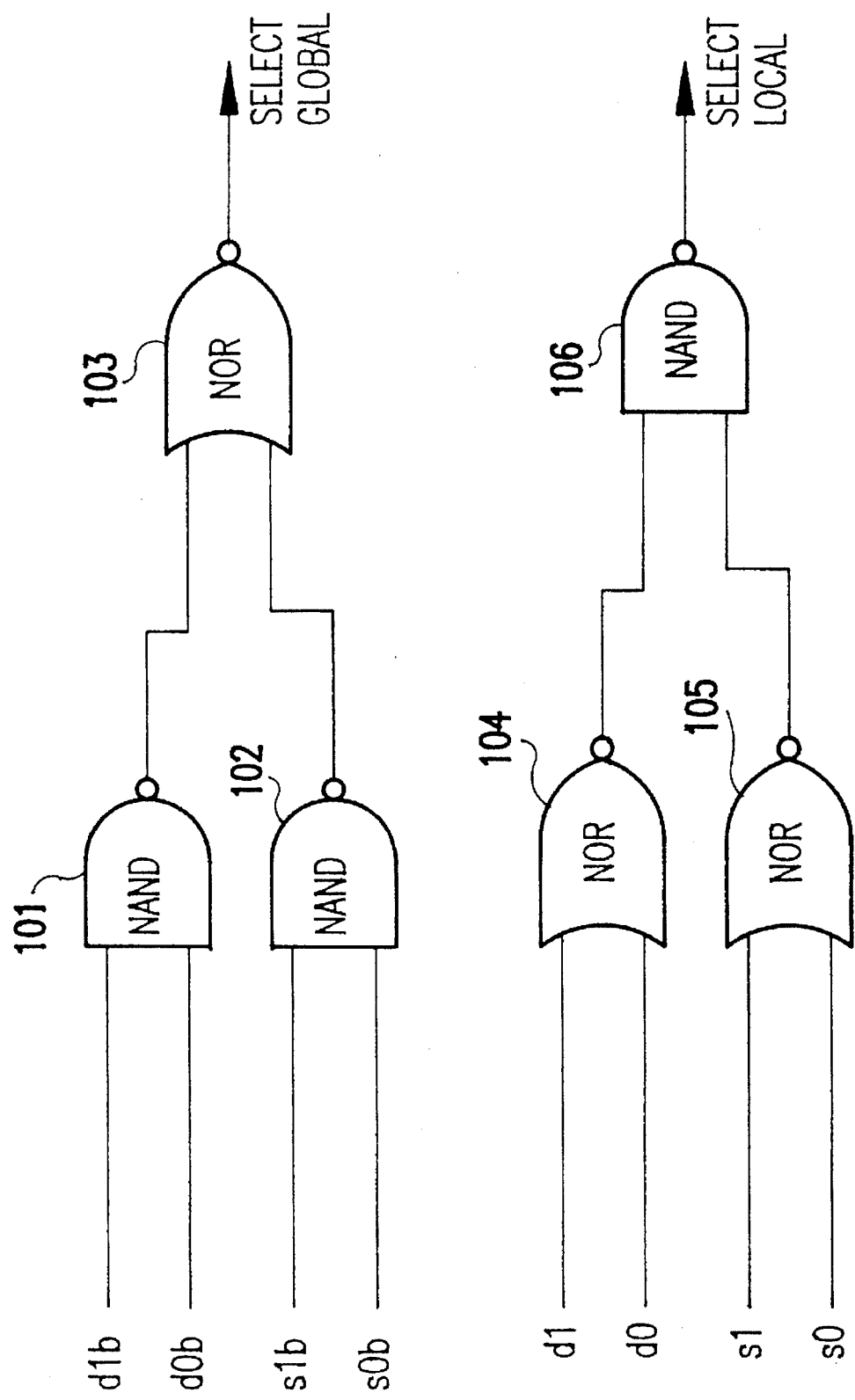
FIG. 7 is a logic diagram of a portion of the carry select circuit producing global select and local select outputs.

The select portion of the carry generation circuit is shown in FIG. 7 and again comprises two parts, corresponding to the two outputs of this portion of the circuit. The connections shown are for the carry generator circuit 33, the connections for carry generator circuit 34 being defined above. The first part comprises two NAND gate 101 and 102 having outputs connected to a NOR gate 103. The output of this NOR gate is the select global signal. The inputs of NAND gate 101 are lines db<0> and db<1>. The inputs of NAND gate 102 are sb<0> and sb<1>. The second part comprises to NOR gates 104 and 105 connected to a NAND gate 106. The output of NAND gate 106 is the select local signal. The inputs to NOR gate 104 are lines d<0> and d<1>. The inputs to NOR gate 105 are lines s<0> and s<1>.

The rotating priority selector according to the invention results in a critical path half that achieved in the prior art allowing microprocessors designed to execute instructions out of sequence to achieve their full performance potential. While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A rotating priority selection logic circuit to select a next instruction to be executed in a microprocessor having an architecture to execute out of sequence instructions, comprising:

carry generate means connected to a first input bus supplying data that identifies instructions with a priority according to age and further connected to a data bus supplying data that defines if instructions are ready for execution for producing output signals including local carry, select local and select global signals;

logic means responsive to said local carry, select local and select global signals from said carry generate means for generating a carry out signal and first and second selection signals respectively based on a global carry being zero and a global carry being one;

first priority selection means connected to said first input bus and connected to said data bus, said first priority selection means wired for a carry input signal of zero to generate first candidate output signals;

second priority selection means connected to said first input bus and connected to said data bus, said second priority selection means wired for a carry input signal of one to generate second candidate output signals; and selection means connected to receive said first and second candidate output signals from said first and second priority selection means respectively and responsive to a carry input signal and said first and second selection signals from said logic means for selecting one of said first and second candidate output signals to an output pointer bus, carry signals being rotated in a loop from carry out signals to carry in signals to cause instructions which are lower in priority to be suppressed, the loop being broken, so as not to feed back on itself, to point to a highest priority instruction with valid operands identifying a next instruction to be executed by said microprocessor.

2. The rotating priority selection logic circuit recited in claim 1 wherein the circuit is composed of a plurality of identical modules connected in a loop with carry out signals from one module being supplied as carry in signals to a next module.

3. The rotating priority selection logic circuit as recited in claim 1 wherein said selection means comprises:

a first selection circuit responsive to said carry in signal to select a first output from one of said first and second priority selection means; and a plurality of selection circuits responsive to said first and second selection signals to select a second output from said first and second priority selection means.

4. The rotating priority selection logic circuit recited in claim 2 wherein said logic means includes tri-state circuits for outputting said carry out signal.

5. A rotating priority selection logic circuit to select a next instruction to be executed in a microprocessor having an architecture to execute out of sequence instructions, said rotating priority selection logic circuit being composed of a plurality of identical modules each receiving carry in signals and generating carry out signals and connected in a loop with carry out signals from one module being supplied as carry in signals to a next module, each said module comprising:

carry generate means connected to a first input bus supplying data that identifies instructions with a priority according to age and further connected to a data bus supplying data that defines if instructions are ready for execution for producing output signals including local carry, select local and select global signals;

logic means responsive to said local carry, select local and select global signals from said carry generate means for generating a carry out signal and first and second selection signals respectively based on a global carry being zero and a global carry being one;

first priority selection means connected to said first input bus and connected to said data bus, said first priority selection means wired for a carry input signal of zero to generate first candidate output signals;

second priority selection means connected to said first input bus and connected to said data bus, said second priority selection means wired for a carry input signal of one to generate second candidate output signals; and selection means connected to receive said first and second candidate output signals from said first and second priority selection means respectively and responsive to a carry input signal and said first and second selection signals from said logic means for selecting one of said first and second candidate output signals to an output pointer bus, carry signals being rotated in a loop from carry out signals to carry in signals to cause instructions which are lower in priority to be suppressed, the loop being broken, so as not to feed back on itself, to point to a highest priority instruction with valid operands identifying a next instruction to be executed by said microprocessor, wherein each of said first and second priority selection means in each module comprises first and second two bit priority selection circuits, said selection means comprises a first selection circuit responsive to said carry in signal to select two bits from a first two bit priority selection circuit from each of said first and second priority selection means, and a plurality of selection circuits responsive to said first and second selection signals to select two bits from a second two bit priority selection circuit from each of said first and second priority selection means.

6. The rotating priority selection logic circuit recited in claim 5 wherein each module receives four bits from each of said first input bus and said data bus and generates four bits on said output bus.

* * * * *